US007652663B2

(12) United States Patent
Sun

(10) Patent No.: US 7,652,663 B2
(45) Date of Patent: Jan. 26, 2010

(54) DISPLAY PANEL AND OPERATING METHOD THEREFOR

(75) Inventor: Wein-Town Sun, Kaohsiung (TW)

(73) Assignee: AU Optronics Corp., Hsinchu (TW)

(*) Notice: Subject to any disclaimer, the term of this patent is extended or adjusted under 35 U.S.C. 154(b) by 640 days.

(21) Appl. No.: 11/243,835

(22) Filed: Oct. 5, 2005

(65) Prior Publication Data

US 2006/0267508 A1 Nov. 30, 2006

(30) Foreign Application Priority Data

May 31, 2005 (TW) .............................. 94117790 A

(51) Int. Cl.
*G06F 3/038* (2006.01)
*G09G 3/30* (2006.01)
*G09G 3/10* (2006.01)

(52) U.S. Cl. ........................ 345/207; 345/76; 315/169.3

(58) Field of Classification Search ............. 345/76-77, 345/207; 315/169.3
See application file for complete search history.

(56) References Cited

U.S. PATENT DOCUMENTS

| | | | | |
|---|---|---|---|---|
| 6,020,864 | A * | 2/2000 | Bancal | 345/76 |
| 7,184,009 | B2 * | 2/2007 | Bergquist | 345/90 |
| 7,205,988 | B2 | 4/2007 | Nakamura et al. | |
| 7,239,309 | B2 * | 7/2007 | Smith et al. | 345/207 |
| 2002/0011976 | A1 * | 1/2002 | Hashimoto | 345/76 |
| 2006/0164344 | A1 * | 7/2006 | Fish | 345/76 |
| 2007/0109286 | A1 | 5/2007 | Nakamura et al. | |

FOREIGN PATENT DOCUMENTS

| | | |
|---|---|---|
| CN | 1482588 | 3/2004 |
| WO | WO2005015530 | 2/2005 |
| WO | WO 2005015530 A1 * | 2/2005 |

OTHER PUBLICATIONS

China Office Action mailed Jul. 27, 2007.

* cited by examiner

*Primary Examiner*—Amr Awad
*Assistant Examiner*—Waseem Moorad
(74) *Attorney, Agent, or Firm*—Thomas, Kayden, Horstemeyer & Risley

(57) ABSTRACT

A display panel for OLED device having a display mode and an input mode. The display panel comprises a driving unit, a capacitor, a light-emitting diode, a light-detecting unit, and a detecting unit. The driving unit has a control electrode coupled to a first node, a first electrode coupled to a first voltage source, and a second electrode. The capacitor and the light-detecting unit are coupled between the first node and the first voltage source. The light-emitting diode is coupled between the control electrode of the driving unit and a second voltage source. In the input mode, the detecting unit detects a voltage at the first node.

23 Claims, 5 Drawing Sheets

100

DISPLAY PANEL AND OPERATING METHOD THEREFOR

BACKGROUND

The invention relates to a display device, and in particular to a display panel having a display mode and an input mode employed in a display device.

As electronic commerce has created and the transmission rate of information exchange has increased, conventional input interfaces, such as keyboards and mice, cannot adequately satisfy the requirement for rapid data transmission. Thus, new modes of inputting information, such as vocal voice and handwritten input, may replace conventional input interfaces. An alternative input interface is the touch panel developed.

In the prior art of touch panels, since leakage current of amorphous silicon thin film transistors (a-Si TFTs) is sensitive to light, a-Si TFTs are used to form photodiodes serving as image sensors. Jeong Hyun Kim of LG. Philips LCD Co. discloses a fingerprint scanner, in which a photodiode formed by an a-Si TFT senses the light reflected by a finger, and then a readout amplifier determines a fingerprint.

Moreover, T.Nakamura of Toshiba Matsushita Display discloses a TFT-LCD with image capture function using LTPS technology, in which a low temperature poly-silicon (LTPS) TFT serves as a light sensor. In the TFT-LCD of T.Nakamura, light from a backlight source is transmitted to an object through a pixel unit, and an LTPS TFT senses the light reflected from the object, resulting in the discharge of a storage capacitor within the pixel unit. Finally the image of the object is determined according to the charges in the storage capacitor.

SUMMARY

Display panels are provided. An exemplary embodiment of a display panel is employed in an organic light emitting display (OLED) device having a display mode and an input mode and comprises a driving unit, a capacitor, a light-emitting diode, a light-detecting unit, and a detecting unit. The driving unit has a control electrode coupled to a first node, a first electrode coupled to a first voltage source, and a second electrode. The capacitor is coupled between the first node and the first voltage source. The light-emitting diode is coupled between the control electrode of the driving unit and a second voltage source. The light-detecting unit is coupled between the first node and the first voltage source. The detecting unit is coupled to the first node. In the input mode, the detecting unit detects a voltage at the first node.

DESCRIPTION OF THE DRAWINGS

The invention will become more fully understood from the detailed description given hereinbelow and the accompanying drawings, given by way of illustration only and thus not intended to be limitative of the invention.

DETAILED DESCRIPTION

Figure 1:
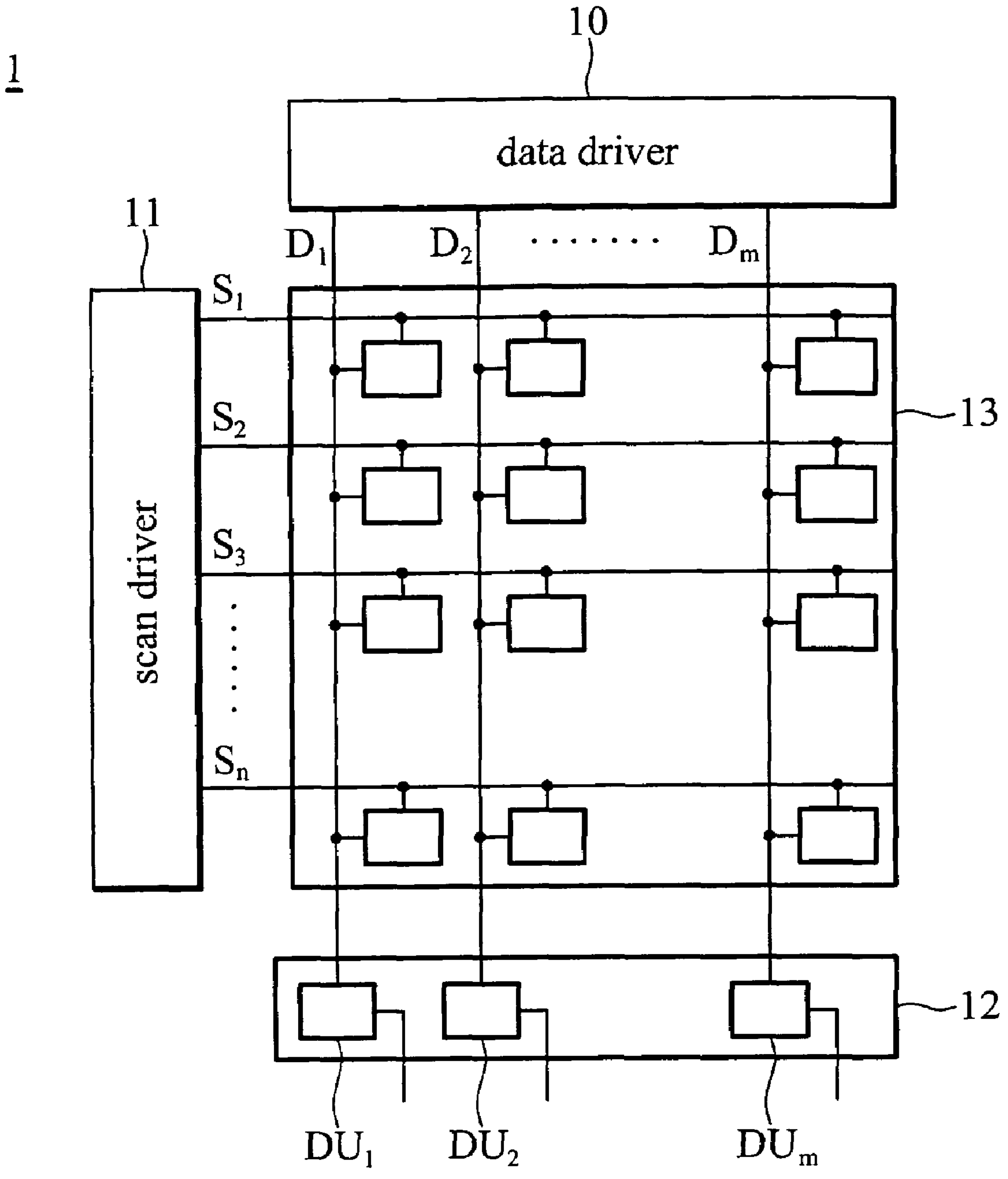
FIG. 1 depicts an embodiment of a panel of an OLED device.

Display panels are provided. In some embodiments, as shown in FIG. 1, a panel 1 of an organic light emitting display (OLED) device has a display mode and an input mode, comprising a data driver 10, a scan driver 11, a detecting circuit 12, and a display array 13. The data driver 10 controls a plurality of data lines $D_1$ to $D_m$, and the scan driver 11 controls a plurality of scan lines $S_1$ to $S_n$. The detecting circuit 12 comprises a plurality of detecting units $DU_1$ to $DU_m$. The display array 13 comprises a plurality of display units. Each set of interlacing data line and scan line corresponds one display unit, such as the interlacing data line $D_1$ and scan line $S_1$ correspond to the display unit 100. In this embodiment, each data line is coupled to one detecting unit, for example, the data line $D_1$ is coupled to the detecting unit $DU_1$.

Figure 2:
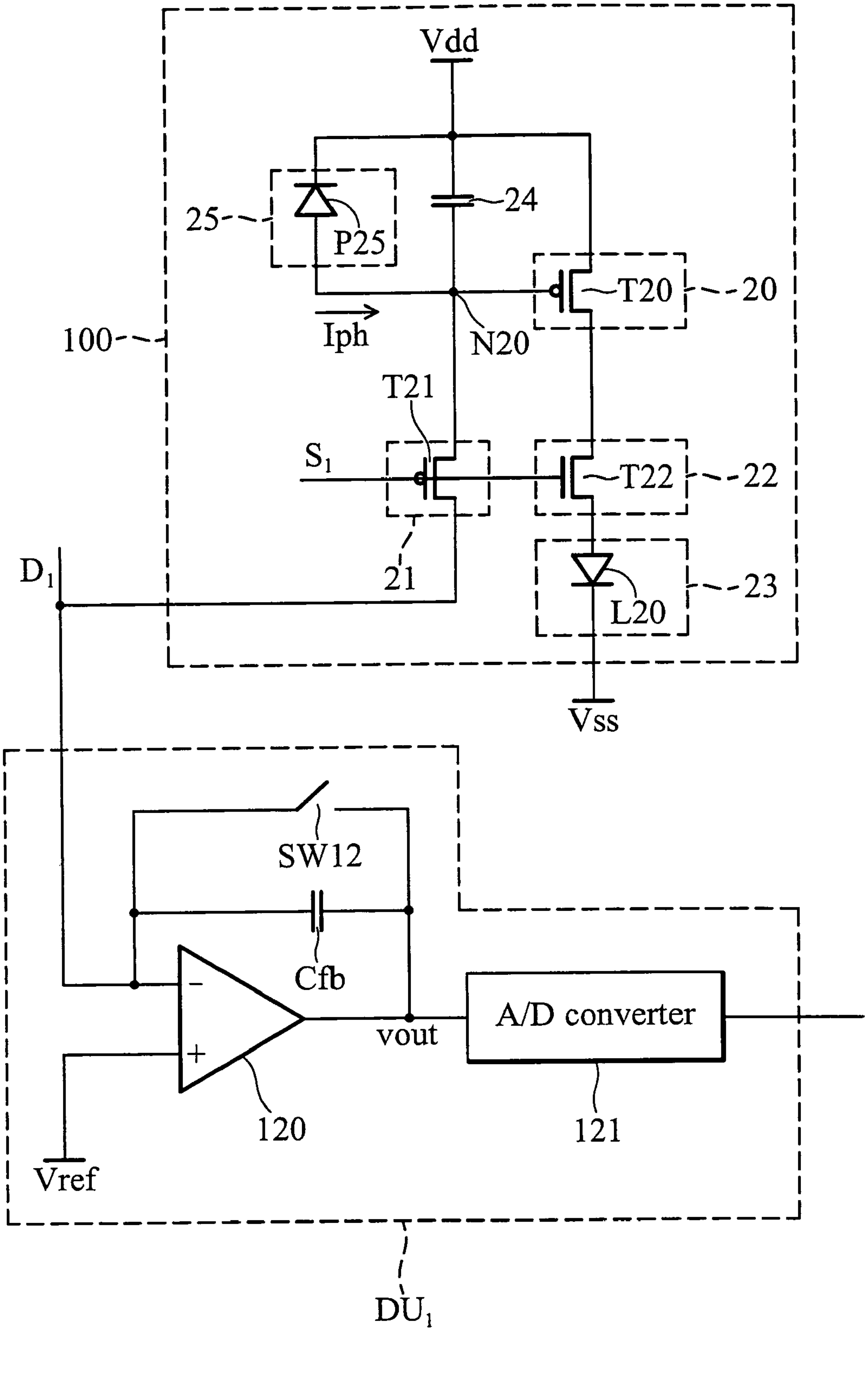
FIG. 2 depicts an embodiment of a display unit and a detecting unit in FIG. 1.

FIG. 2 shows an embodiment of the display unit 100 and the detecting unit $DU_1$ in FIG. 1. As with any other display unit, the display unit 100 comprises a driving unit 20, switch units 21 and 22, a light-emitting unit 23, a storage capacitor 24, and a light-detecting unit 25. In FIG. 2, the driving unit 20 comprises a P-type transistor T20, the switch units 21 and 22 are a P-type transistor T21 and an N-type transistor T22 respectively, the light-emitting unit 23 comprises a light-emitting diode (LED) L20, and the light-detecting unit 25 comprises a photodiode P25.

A gate (control electrode) of the transistor T20 is coupled to a node N20, a drain (first electrode) thereof is coupled to a drain of the transistor T22, and a source (second electrode) thereof is coupled a voltage source Vdd. A gate of the transistor T21 is coupled to the scan line $S_1$, a drain thereof is coupled to the data line $D_1$, and a source thereof is coupled to the node N20. A gate of the transistor T22 is coupled to the scan line $S_1$, and a source thereof is coupled to the LED L20. The photodiode P25 and the storage capacitor 24 are coupled between the voltage source Vdd and the node N20. The LED L20 is coupled between the source of the transistor T22 and a voltage source Vss. The voltage sources Vdd and Vss respectively provide high level voltage vdd and low level voltage vss.

The detecting unit $DU_1$ comprises a charge amplifier 120 and an analog/digital (A/D) converter 121. A noninverting input terminal (−) of the charge amplifier 120 is coupled to the data line $D_1$, and an inverting input terminal (+) thereof is coupled to a reference voltage source Vref. A switch SW12 and a capacitor Cfb are coupled in parallel between the noninverting input terminal (−) and the inverting input terminal (+) of the charge amplifier 120. The A/D converter 121 is coupled to an output terminal of the charge amplifier 120.

When the OLED device operates in the display mode, the transistors T21 and T22 are respectively turned on and off according to a scan signal on the scan line $S_1$, and the data line $D_1$ transmits a data signal to the display unit 100, so that voltage v20 at the node N20 is equal to voltage vdata of the data signal. At this time, the voltage stored in the storage capacitor 24 is equal to (vdd-vdata). The transistors T21 and T22 are then respectively turned off and on. The transistor T20 is turned on according to the data voltage vdata at the node N20 and thus generates a driving current to drive the LED L20 to emit light.

When the OLED device operates in the input mode, the transistors T21 and T22 are respectively turned on and off. First, the reference voltage source Vref of the charge amplifier 120 provides a reference voltage vref to the node N20 through the data line $D_1$, so that the voltage v20 at the node N20 is set to the reference voltage vref. At this time, saturation charge stored in the storage capacitor 24 is given by:

$$Q_{sat}=cs*(\text{vdd}-\text{vref})$$

wherein, $Q_{sat}$ represents the saturation charge, and cs represents the value of the storage capacitor 24.

Figure 3:
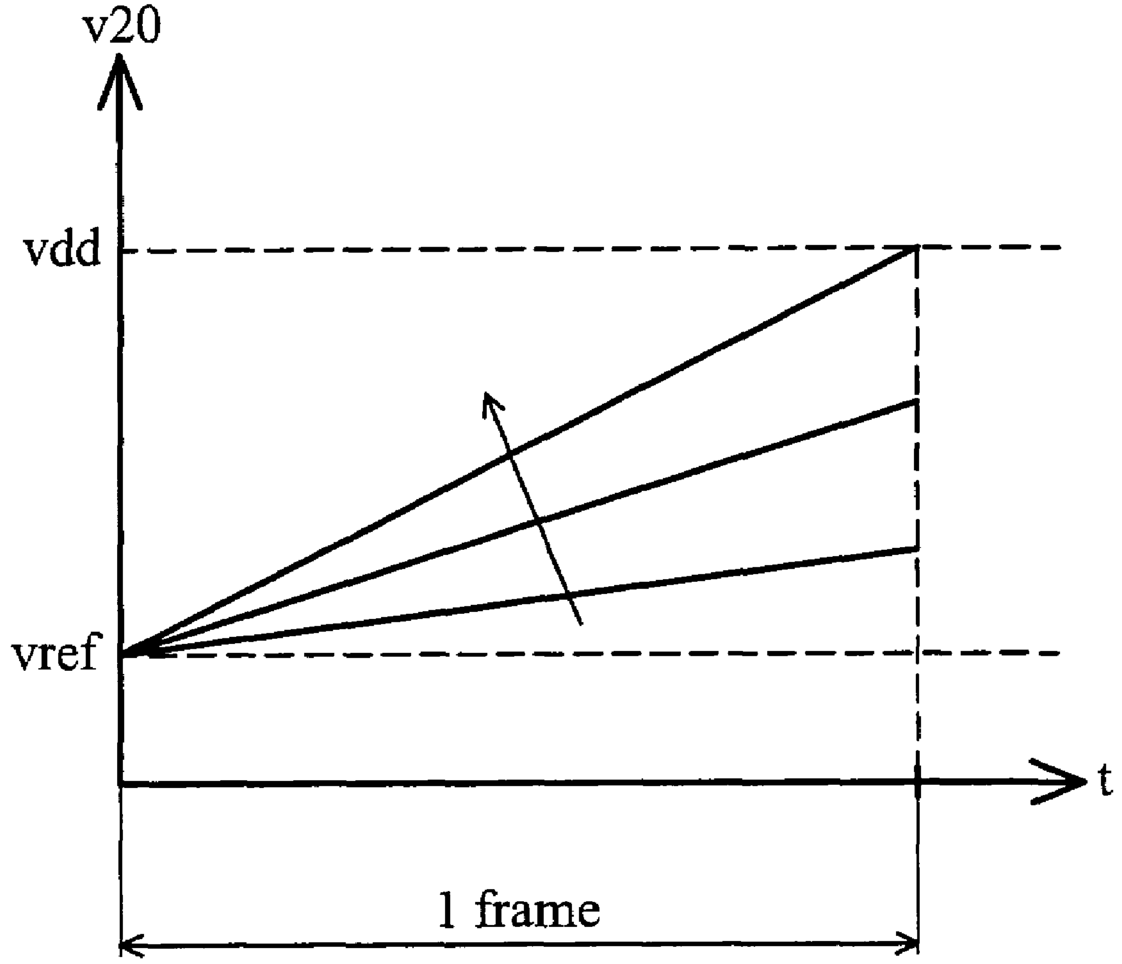
FIG. 3 depicts the relationship between the voltage v20 in FIG. 2 and the brightness.

The transistors T21 and T22 are then respectively turned off and on, and the transistor T20 drives the LED L20 to emit light according to the voltage v20 (equal to voltage vref) at the node N20. An object serving as an input tool is irradiated by the LED L20. The object reflects different degrees of light to the display unit 100 according the gray levels of the surface of the object. The photodiode P25 senses the reflected light and generates photo current Iph, resulting in leakage voltage of the node N20. Thus, the voltage v20 at the node N20 is increased from the voltage vref toward the voltage vdd due to the leakage current of the photodiode P25. When brightness of the reflected light is higher, the leakage current of the photodiode P25 is greater, and the largest voltage v20 is equal to the voltage vdd. FIG. 3 depicts the relationship between the voltage v20 and the brightness, wherein the direction of an arrow A represents that the brightness of the reflected light is from high to low in a frame. The charge amplifier 120 of the detecting unit $DU_1$ reads out and amplifies the value of the voltage v20, and then outputs readout voltage vout:

$$vout=\frac{\int_{t0}^{t0+Tf} iph(t)dt}{cfb}$$

wherein, iph(t) represents the value of the photo current Iph, t0 represents the time when the value of the voltage v20 is read out, Tf represents a frame, and cfb represents the value of the capacitor Cfb.

According to the saturation charge, the largest readout voltage voutmax is thus given by:

$$vout\,\max=\frac{cs*(vdd-vref)}{cfb}$$

After the readout voltage vout output by the charge amplifier 120 is converted by the A/D converter 121, the A/D converter 121 outputs a corresponding digital input signal to back-end devices for processing or storing. The switch SW12 of the charge amplifier 120 is then turned on to reset the voltage v20 to be the reference voltage vref.

Figure 4:
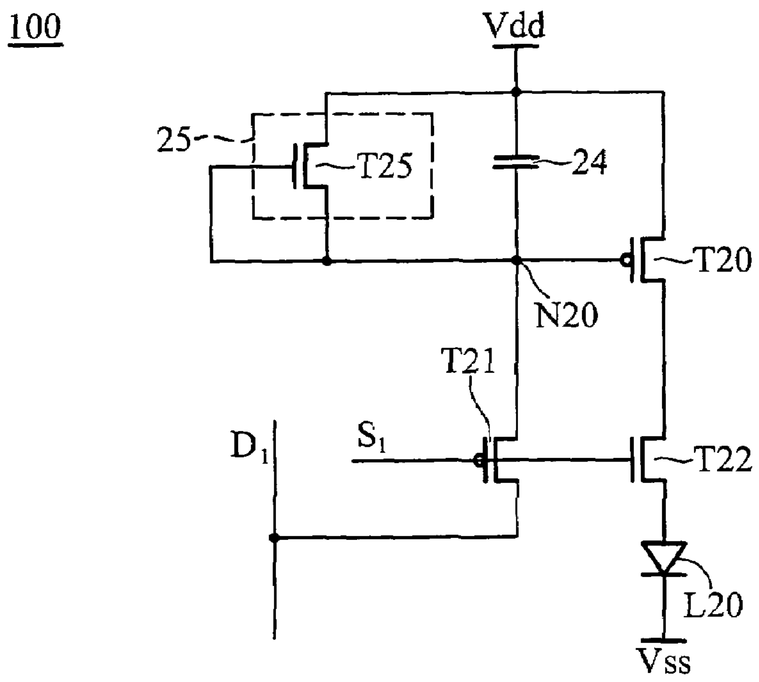
FIG. 4 depicts an embodiment of a light-detecting unit.
Figure 5:
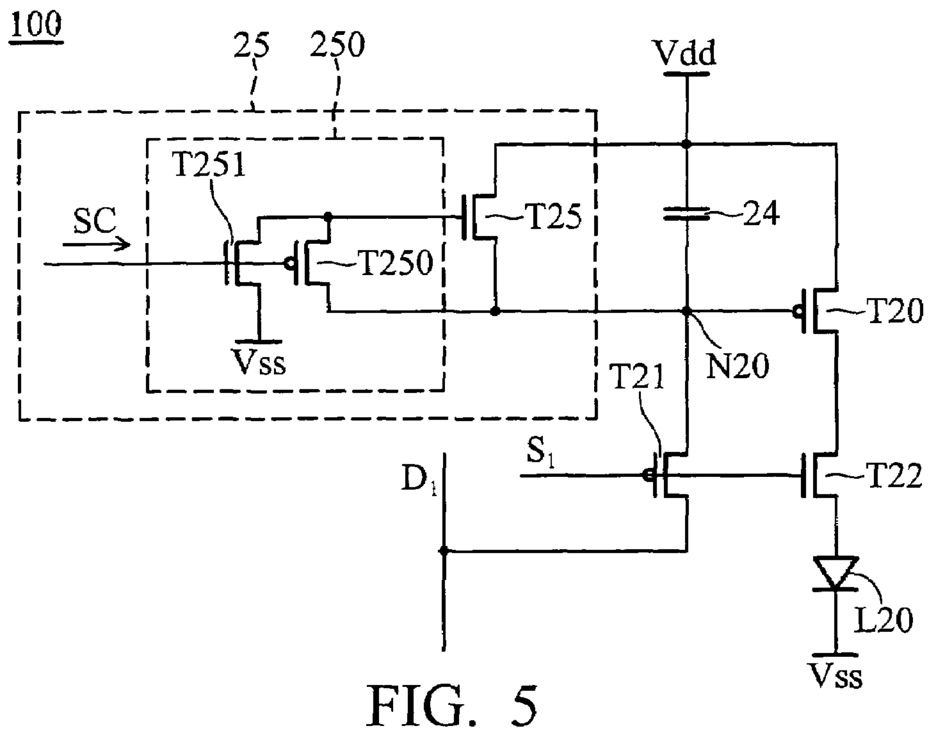
FIG. 5 depicts an embodiment of a light-detecting unit.

The photodiode P25 of this embodiment can be implemented by a transistor T25, referring to FIG. 4. A source of the transistor T25 is coupled to the voltage source Vdd, and a gate and a drain thereof are both coupled to the node N20. It is noted that the light-detecting unit 25 is used to sense light only when the OLED device operates in the input mode. Thus, the light-detecting unit 25 is enabled according to a control signal SC in the input mode to reduce power consumption. Referring to FIG. 5, the light-detecting unit 25 further comprises a control unit 250. The control unit 250 comprises transistors T250 and T251. In this embodiment, the transistors T250 and T251 are respectively P-type and N-type. A gate of the transistor T250 receives the control signal SC, a source thereof is coupled to the gate of the transistor T25, and a drain thereof is coupled to the node N20. A gate of the transistor T251 receives the control signal SC, a drain thereof is coupled to the gate of the transistor T25, and a source thereof is coupled to the voltage source Vss.

Referring to FIG. 5, when the OLED device operates in the display mode, the light-detecting unit 25 is not used to sense light. The transistors T250 and T251 are respectively turned off and on by the control signal SC with a high voltage level. The gate of the transistor T25 is coupled to the low level voltage source Vss through the transistor-T251. The transistor T25 is thus turned off and does not sense light. When the OLED device operates in the input mode, the light-detecting unit 25 is used to sense light. The transistors T250 and T251 are respectively turned on and off by the control signal SC with a low voltage level. The gate and drain of the transistor T25 are coupled together to form a photodiode.

Figure 6:
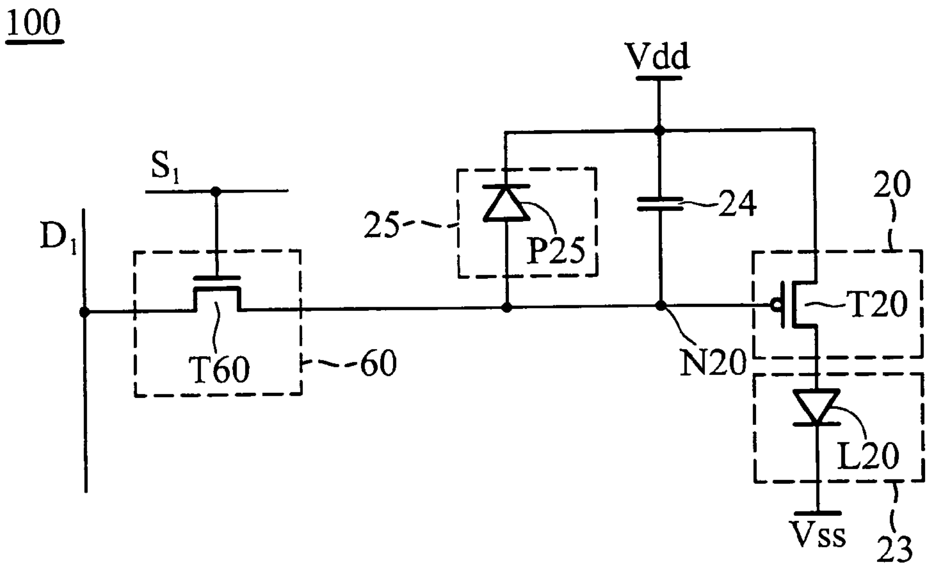
FIGS. 6 and 7 depict embodiments of a display unit.

In some embodiments, as shown in FIG. 6, the display unit 100 comprises driving unit 20, switch unit 60, a light-emitting unit 23, a storage capacitor 24, and a light-detecting unit 25. In FIGS. 2 and 6, like reference numbers are used to designate like parts, and the descriptions of the like parts are omitted here. In this embodiment of FIG. 6, the switch unit 60 is an N-type transistor T60.

A gate of the transistor T60 is coupled to the scan $S_1$, and a drain thereof is coupled to the data line $D_1$, and a drain thereof is coupled to the node N20. The light-detecting unit 25 can comprise the circuitry in FIG. 4 or FIG. 5.

Figure 7:
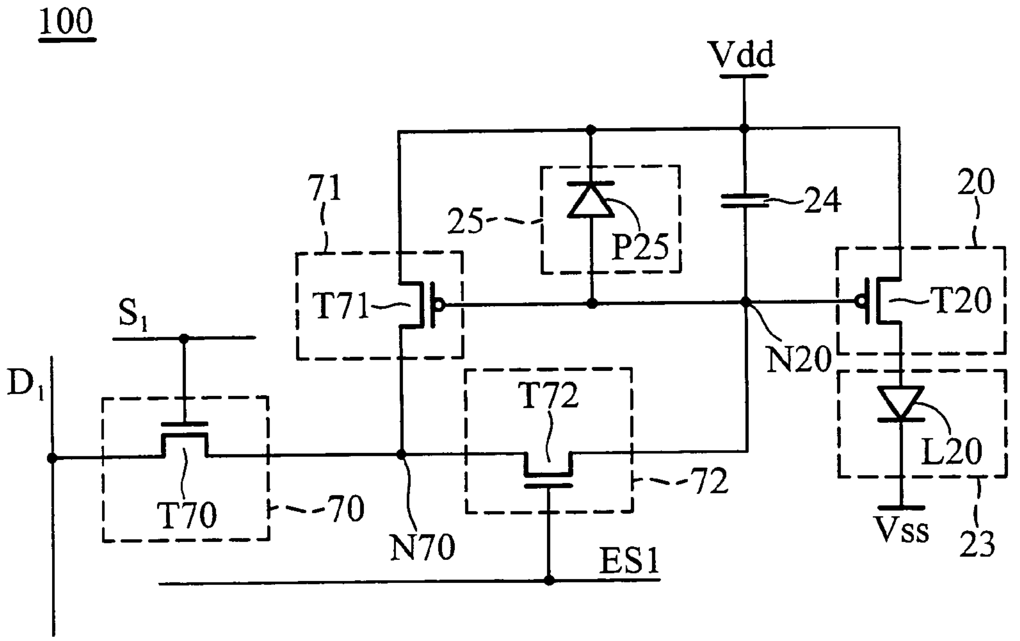

In some embodiments, as shown in FIG. 7, the display unit 10.0 comprises driving unit 20, switch units 70 to 72, a light-emitting unit 23, a storage capacitor 24, and a light-detecting unit 25. In FIGS. 2 and 7, like reference numbers are used to designate like parts, and the descriptions of the like parts are omitted here. In this embodiment of FIG. 7, the switch units 70 and 72 are N-type transistors T70 and T72, and the switch unit 71 is a P-type transistor.

A gate of the transistor T70 is coupled to the scan line $S_1$, a drain thereof is coupled to the data line $D_1$, and a source thereof is coupled to a node N70. A gate of the transistor T71 is coupled to the node N20, a source thereof is coupled to the node N70, and a drain thereof is coupled to the voltage source Vdd. A gate of the transistor T72 is coupled to an erase scan line $ES_1$, a drain thereof is coupled to the node N70, and a source thereof is coupled to the node N20. In one frame, the timing of an erase signal on the erase scan line $ES_1$ is different from that of the scan signal on the scan line $S_1$. Moreover, the pulse of the erase signal appears following that of the scan signal. The light-detecting unit 25 can comprise the circuitry in FIG. 4 or FIG. 5.

According to the described embodiments, an OLED device has a display mode and an input mode. When the OLED operates in the display mode, a display panel displays images. When the OLED operates in the input mode, a light-detecting unit within each display unit senses the light reflected by an object, and a detecting circuit determines the input signal according to the reflected light. Moreover, the light-detecting unit can be implemented by an LTPS TFT.

While the invention has been described in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display panel for an organic light emitting display (OLED) device having a display mode and an input mode, the display panel comprising:

a driving unit having a control electrode coupled to a first node, a first electrode coupled to a first voltage source, and a second electrode;

a capacitor coupled between the first node and the first voltage source;

a light-emitting diode coupled between the second electrode of the driving unit and a second voltage source, wherein in the display mode, the light- emitting diode emits light according to voltage at the node;

a light-detecting unit coupled between the first node and the first voltage source; and a detecting unit coupled to the first node and detecting a voltage at the first node in the input mode;

wherein in the input mode, the light-emitting diode emits light to an object, and the detecting unit detects reflected light from the object such that voltage variation occurs at the first node; and wherein the light-detecting unit comprises a first transistor having a control electrode directly connected to the control electrode of the driving unit, a first electrode directly connected to the control electrode of the driving unit, and a second electrode directly connected to the first voltage source.

2. The display panel as claimed in claim 1, wherein the detecting unit comprises:

a charge amplifier, coupled to the first node, for receiving a reference voltage and detecting the voltage at the first node to generate a readout voltage; and an analog/digital converter for generating an input signal according to the readout voltage.

3. The display panel as claimed in claim 1, further comprising:

a first switch unit having a control electrode coupled to a scan line, a first electrode coupled to the first node, and a second electrode coupled to a data line; and a second switch unit having a control electrode, a first electrode coupled to the first electrode of the driving unit, and a second electrode coupled to the light-emitting diode.

4. The display panel as claimed in claim 3, wherein the first switch unit is a first-type transistor, and the second switch unit is a second-type transistor.

5. The display panel as claimed in claim 1, further comprising a switch unit having a control electrode coupled to a scan line, a first electrode coupled to a data line, and a second electrode coupled to the first node.

6. The display panel as claimed in claim 1, further comprising:

a first switch unit having a control electrode coupled to a scan line, a first electrode coupled to a data line, and a second electrode coupled to a second node;

a second switch unit having a control electrode coupled to the first node, a first electrode coupled to the second node, and a second electrode coupled to the first voltage source; and a third switch unit having a control electrode coupled to an erase scan line, a first electrode coupled to the second node, and a second electrode coupled to the first node.

7. The display panel as claimed in claim 6, wherein the second switch unit is a P-type transistor, and the first and third switch units are N-type transistors.

8. The display panel as claimed in claim 6, wherein the second switch unit is an N-type transistor, and the first and third switch units are P-type transistors.

9. The display panel as claimed in claim 6, wherein the signal timing of the erase scan line is different from that of the scan line.

10. The display panel as claimed in claim 9, wherein a pulse on the erase scan line appears following that of the scan line.

11. The display panel as claimed in claim 1, wherein the first transistor is a low temperature poly-silicon thin film transistor.

12. The display panel as claimed in claim 1, further comprising:

a second transistor having a control electrode receiving a control signal, a first electrode electrically connected to the control electrode of the driving unit and a second electrode electrically connected to the control electrode of the first transistor; and a third transistor having a control electrode receiving the control signal, a first electrode electrically connected to the control electrode of the first transistor, and a second electrode electrically connected to the second voltage source;

wherein when the OLED device operates in the display mode, the third transistor is turned on according to the control signal, electrically connecting the control electrode of the first transistor to the second voltage source through the third transistor; and wherein when the OLED device operates in the input mode, the second transistor is turned on according to the control signal, electrically connecting the control electrode of the first transistor to the control electrode of the driving unit through the second transistor.

13. The display panel as claimed in claim 12, wherein the second transistor is a first-type transistor, and the third transistor is a second-type transistor.

14. The display panel as claimed in claim 13, wherein the first transistor is a second-type transistor.

15. The display panel as claimed in claim 1, wherein the first transistor is a low temperature poly-silicon thin film transistor.

16. A display panel for an organic light emitting display (OLED) device having a display mode and an input mode, the display panel comprising:

a driving unit having a control electrode coupled to a first node, a first electrode coupled to a first voltage source, and a second electrode;

a capacitor coupled between the first node and the first voltage source;

a light-emitting diode coupled between the second electrode of the driving unit and a second voltage source;

a first switch unit having a control electrode coupled to a scan line, a first electrode coupled to the first node, and a second electrode coupled to a data line;

a second switch unit having a control electrode, a first electrode coupled to the first electrode of the driving unit, and a second electrode coupled to the light-emitting diode a light-detecting unit coupled between the first node and the first voltage source; and a detecting unit coupled to the first node and detecting a voltage at the first node in the input mode; and wherein the light-detecting unit comprises a first transistor having a control electrode directly connected to the control electrode of the driving unit, a first electrode directly connected to the control electrode of the driving unit, and a second electrode directly connected to the first voltage source.

17. The display panel as claimed in claim 16, wherein the detecting unit comprises:

a charge amplifier, coupled to the first node, for receiving a reference voltage and detecting the voltage at the first node to generate a readout voltage; and an analog/digital converter for generating an input signal according to the readout voltage.

18. The display panel as claimed in claim 16, wherein the first switch unit is a first-type transistor, and the second switch unit is a second-type transistor.

19. The display panel as claimed in claim 16, further comprising a switch unit having a control electrode coupled to a scan line, a first electrode coupled to a data line, and a second electrode coupled to the first node.

20. The display panel as claimed in claim 16, further comprising:

a second transistor having a control electrode receiving a control signal, a first electrode electrically connected to the control electrode of the driving unit and a second electrode electrically connected to the control electrode of the first transistor; and a third transistor having a control electrode receiving the control signal, a first electrode electrically connected to the control electrode of the first transistor, and a second electrode electrically connected to the second voltage source;

wherein when the OLED device operates in the display mode, the third transistor is turned on according to the control signal, electrically connecting the control electrode of the first transistor to the second voltage source through the third transistor; and wherein when the OLED device operates in the input mode, the second transistor is turned on according to the control signal, electrically connecting the control electrode of the first transistor to the control electrode of the driving unit through the second transistor.

21. A display panel for an organic light emitting display (OLED) device having a display mode and an input mode, the display panel comprising:

a driving unit having a control electrode coupled to a first node, a first electrode coupled to a first voltage source, and a second electrode;

a capacitor coupled between the first node and the first voltage source;

a light-emitting diode coupled between the second electrode of the driving unit and a second voltage source;

a first switch unit having a control electrode coupled to a scan line, a first electrode coupled to a data line, and a second electrode coupled to a second node;

a second switch unit having a control electrode coupled to the first node, a first electrode coupled to the second node, and a second electrode coupled to the first voltage source;

a third switch unit having a control electrode coupled to an erase scan line, a first electrode coupled to the second node, and a second electrode coupled to the first node;

a light-detecting unit coupled between the first node and the first voltage source; and a detecting unit coupled to the first node and detecting a voltage at the first node in the input mode; and wherein the light-detecting unit comprises a first transistor having a control electrode directly connected to the control electrode of the driving unit, a first electrode directly connected to the control electrode of the driving unit, and a second electrode directly connected to the first voltage source.

22. The display panel as claimed in claim 21, wherein the detecting unit comprises:

a charge amplifier, coupled to the first node, for receiving a reference voltage and detecting the voltage at the first node to generate a readout voltage; and an analog/digital converter for generating an input signal according to the readout voltage.

23. The display panel as claimed in claim 21, further comprising:

a second transistor having a control electrode receiving a control signal, a first electrode electrically connected to the control electrode of the driving unit, and a second electrode electrically connected to the control electrode of the first transistor; and a third transistor having a control electrode receiving the control signal, a first electrode electrically connected to the control electrode of the first transistor, and a second electrode electrically connected to the second voltage source;

wherein when the OLED device operates in the display mode, the third transistor is turned on according to the control signal, electrically connecting the control electrode of the first transistor to the second voltage source through the third transistor; and wherein when the OLED device operates in the input mode, the second transistor is turned on according to the control signal, electrically connecting the control electrode of the first transistor to the control electrode of the driving unit through the second transistor.

* * * * *